(12) United States Patent
Hsu

(10) Patent No.: US 9,841,861 B2
(45) Date of Patent: *Dec. 12, 2017

(54) TOUCH PANEL WITH LIGHT-SHIELDING LAYERS

(71) Applicant: Liyitec Incorporated, Taoyuan (TW)

(72) Inventor: Shu-Chen Hsu, Taoyuan (TW)

(73) Assignee: Liyitec Incorporated, Taoyuan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/261,360

(22) Filed: Sep. 9, 2016

(65) Prior Publication Data

US 2016/0378261 A1   Dec. 29, 2016

Related U.S. Application Data

(62) Division of application No. 14/167,005, filed on Jan. 29, 2014, now Pat. No. 9,569,044.

(30) Foreign Application Priority Data

Feb. 8, 2013  (TW) .............................. 102203011 U

(51) Int. Cl.
*G06F 3/044* (2006.01)
*G06F 3/041* (2006.01)
(Continued)

(52) U.S. Cl.
CPC .............. *G06F 3/044* (2013.01); *B32B 15/04* (2013.01); *G06F 3/042* (2013.01); *G06F 3/0412* (2013.01);
(Continued)

(58) Field of Classification Search
None
See application file for complete search history.

(56) References Cited

U.S. PATENT DOCUMENTS

| 2002/0043924 | A1* | 4/2002 | Kato ..................... H01J 9/2271 |
| | | | 313/496 |
| 2004/0043924 | A1 | 3/2004 | Narhi et al. |

(Continued)

FOREIGN PATENT DOCUMENTS

| KR | 101101336 B1 | 1/2012 |
| KR | 20120044500 A | 5/2012 |

(Continued)

*Primary Examiner* — Larry Sternbane
*Assistant Examiner* — Nathan Brittingham
(74) *Attorney, Agent, or Firm* — C. G. Mersereau; Nikolai & Mersereau, P.A.

(57) ABSTRACT

Provided is a touch panel having a display region and a non-display region surrounding the display-region. The touch panel comprises a transparent substrate, a sensing electrode layer, a conductive light-shielding layer, an insulated light-shielding layer, and a wiring layer. The conductive light-shielding layer is formed in the non-display region and between the sensing electrode layer and the wiring layer, and the whole non-display region is covered by the conductive light-shielding layer and the insulated light-shielding layer. With such all arrangement, the touch panel not only maintains the signal transmit function, but also ensures good optical performance in the display region near its interface. Accordingly, a touch screen comprising the touch panel can have good touch sensing functions and good optical performance at the same time.

20 Claims, 4 Drawing Sheets

(51) Int. Cl.
*B32B 15/04* (2006.01)
*G06F 3/042* (2006.01)

(52) U.S. Cl.
CPC ...... *G06F 3/0418* (2013.01); *B32B 2307/202* (2013.01); *B32B 2307/412* (2013.01); *B32B 2457/208* (2013.01); *G06F 2203/04107* (2013.01)

(56) References Cited

U.S. PATENT DOCUMENTS

| | | | | |
|---|---|---|---|---|
| 2007/0216830 | A1* | 9/2007 | Hoshino | G02F 1/1334 349/86 |
| 2009/0185089 | A1* | 7/2009 | Huang | G02F 1/136213 349/38 |
| 2010/0164881 | A1* | 7/2010 | Kuo | G06F 3/044 345/173 |
| 2010/0328586 | A1* | 12/2010 | Huang | G02F 1/1343 349/106 |
| 2011/0266565 | A1* | 11/2011 | Wang | G02F 1/1339 257/91 |
| 2011/0279405 | A1* | 11/2011 | Meng | G06F 3/044 345/174 |
| 2012/0292170 | A1* | 11/2012 | Yin | G06F 3/044 200/512 |
| 2013/0038571 | A1* | 2/2013 | Ho | G06F 3/044 345/174 |
| 2013/0082961 | A1* | 4/2013 | Wang | G06F 3/044 345/173 |
| 2013/0229364 | A1* | 9/2013 | Yu | G06F 3/044 345/173 |
| 2014/0225869 | A1* | 8/2014 | Hsu | G06F 3/044 345/175 |

FOREIGN PATENT DOCUMENTS

| | | |
|---|---|---|
| TW | M383161 U | 6/2010 |
| TW | 201213949 A | 4/2012 |
| TW | M440478 U | 11/2012 |

* cited by examiner

TOUCH PANEL WITH LIGHT-SHIELDING LAYERS

The present invention is a division of U.S. patent application Ser. No. 14/167,005, filed on Jan. 29, 2014. This application claims the priority benefit of Taiwan patent application number 102203011 filed on Feb. 8, 2013.

BACKGROUND OF THE INVENTION

1. Field of the Invention

The present invention relates to a touch panel, more particularly to a touch panel capable of ensuring good optical performance of a touch screen comprising the same.

2. Description of the Prior Arts

With the advance of technology, researches on integrating a touch panel with a display panel are conducted for developing a touch screen having good optical performance and convenience in use, so as to apply the touch screen on various electronic devices such as cell phones, digital cameras, televisions or computers.

A touch panel generally includes a touch region and a non-touch region surrounding the touch region. A frame made of an opaque material is disposed in the non-display region to cover the wiring pattern electrically connected with the sensing electrodes. Accordingly, during operation the user only see items in the display region, i.e. a touch operation region, such that a touch screen of the touch panel has a clear appearance.

With reference to FIG. 4, a touch panel 4 in the art includes a transparent substrate 41, a sensing electrode layer 42, an insulated ink layer 43, a conductive layer 44 and a wiring layer 45. The touch panel 4 is divided into a display region 46 and a non-display region 47 by the insulated ink layer 43. The conductive layer 44 is disposed on both the sensing electrode layer 42 and the insulated ink layer 43, and the wiring layer 45 is disposed on both the insulated ink layer 43 and the conductive layer 44, such that the wiring layer 45 is electrically connected with the conductive layer 44 and the sensing electrode layer 42 for signal transmission.

With the low transmittance of light, the conductive layer 44 disposed at the interface between the display region 46 and non-display region 47 not only reduces the transmittance in the display region 46, but also produces many yellow spots in the display region 46 near the interface, such that the optical performance of a touch screen is deteriorated.

SUMMARY OF THE INVENTION

In view of the foregoing drawbacks, an objective of the present invention is to ensure good optical performance of a touch screen comprising a touch panel on a premise of maintaining both touch and sensing functions, so as to improve application of the touch screen.

To achieve the foregoing objective, the present invention provides a touch panel having a display region and a non-display region surrounding the display-region. The touch panel comprises:

a transparent substrate disposed over the display region and the non-display region;

a sensing electrode layer disposed on the transparent substrate and disposed in the display region and the non-display region;

a conductive light-shielding layer disposed on the sensing electrode layer and in the non-display region; the conductive light-shielding layer having a first surface opposite the transparent substrate in the non-display region;

an insulated light-shielding layer including a first section of the insulated light-shielding layer and a second section of the insulated light-shielding layer; the first section of the insulated light-shielding layer disposed on the transparent substrate in the non-display region and the second section of the insulated light-shielding layer disposed on the sensing electrode layer in the non-display region; the insulated light-shielding layer having a second surface opposite the transparent substrate in the non-display region; the second surface of the insulated light-shielding layer being level with the first surface of the conductive light-shielding layer; and a wiring layer disposed on the conductive light-shielding layer and the second section of the insulated light-shielding layer, the wiring layer electrically connected with the conductive light-shielding layer and the sensing electrode layer.

In accordance with the present invention, the conductive light-shielding layer has a contact surface and a first surface opposite each other. In a preferred embodiment, the contact surface contacts the sensing electrode layer, and the first surface directly contacts the wiring layer, such that the wiring layer is electrically connected with the sensing electrode layer through the conductive light-shielding layer.

Preferably, the insulated light-shielding layer surrounds the conductive light-shielding layer. That is, the conductive light-shielding layer has a top surface in contact with the wiring layer, a bottom surface in contact with the sensing electrode layer, and a side surface between the top surface and the bottom surface and surrounded by the insulated light-shielding layer.

Preferably, the first surface of the conductive light-shielding layer is opposite the transparent substrate in the non-display region, the insulated light-shielding layer has a second surface opposite the transparent substrate in the non-display region, and the second surface of the insulated light-shielding layer is level with the first surface of the conductive light-shielding layer.

Preferably, the touch panel has a metal film formed between the wiring layer and the conductive light-shielding layer. The insulated light-shielding layer has a second surface opposite the transparent substrate in the non-display region, and the metal film has a third surface opposite the transparent substrate in the non-display region, and the third surface of the metal film is level with the second surface of the insulated light-shielding layer.

Preferably, the sensing electrode layer in the display region comprises:

multiple first electrode units disposed on the transparent substrate and in the display region, the first electrode units arranged at constant intervals along a first axial direction;

multiple first axial wires each connecting two adjacent first electrode units;

multiple second electrode units disposed on the transparent substrate and in the display region and arranged at constant intervals along a second axial direction, and the second axial direction intersecting with the first axial direction;

multiple second axial wires each connecting two adjacent second electrode units; and multiple insulation layers formed between the first axial wires and the second axial wires.

Said first electrode units and/or the second electrode units are formed in a shape of triangle, rhombus, or hexagon, but not limited thereto.

The sensing electrode layer includes a material selected from a group consisting of: transparent and conductive material, including indium tin oxide (ITO), indium zinc oxide (IZO), aluminum zinc oxide (AZO), indium tin zinc oxide (ITZO), zinc oxide (ZnO), indium gallium zinc oxide (InGaZnO) and any combinations thereof.

The wiring layer is made of a material including copper, gold, silver, nickel, aluminum, chromium or any combination thereof.

The transparent substrate is made of a material including glass, quartz or transparent polymers.

The metal film is an aluminum-molybdenum-aluminum layer, which is laminated by two aluminum layers and a molybdenum layer formed between the two aluminum layers.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
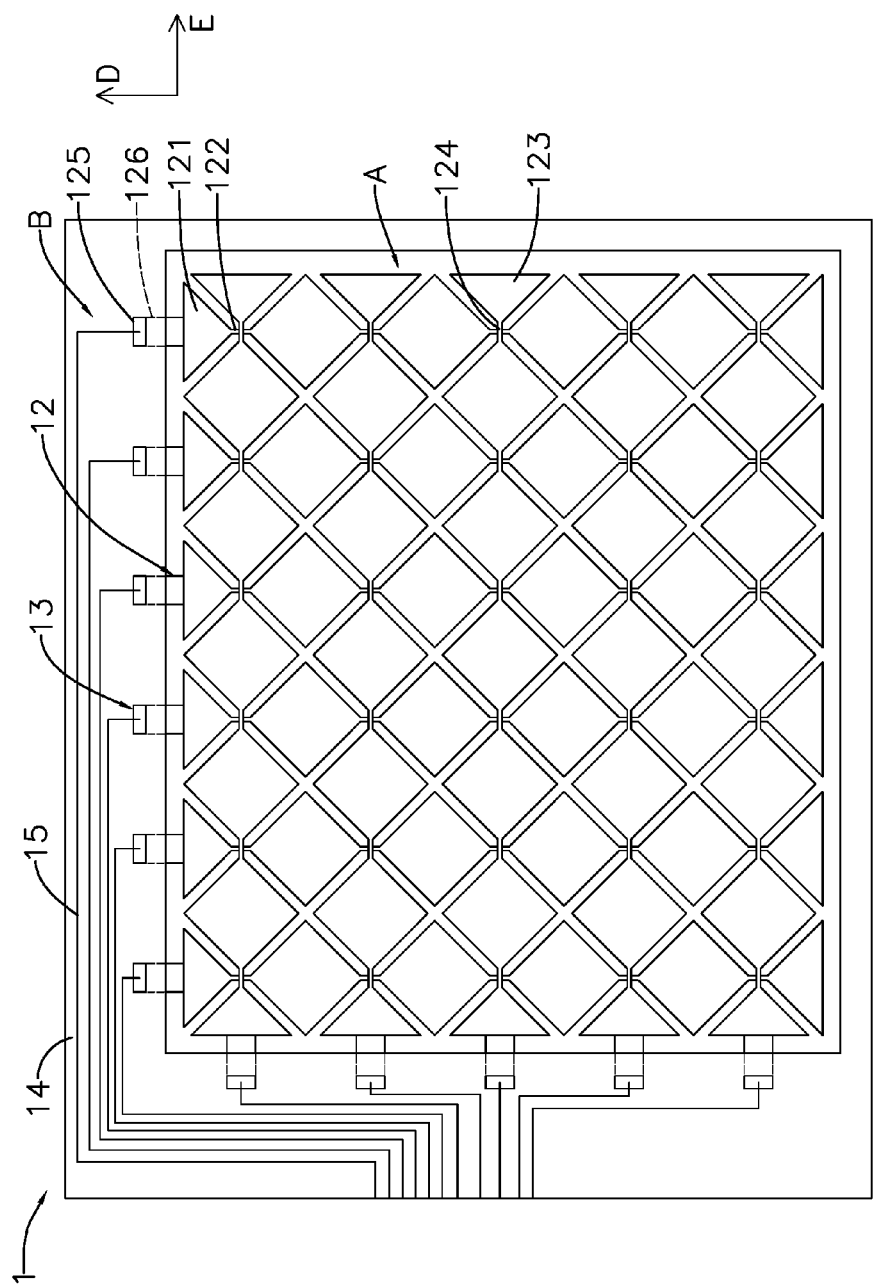
FIG. 1 is a planar schematic view of a first embodiment of a touch panel in accordance with the present invention.
Figure 2:
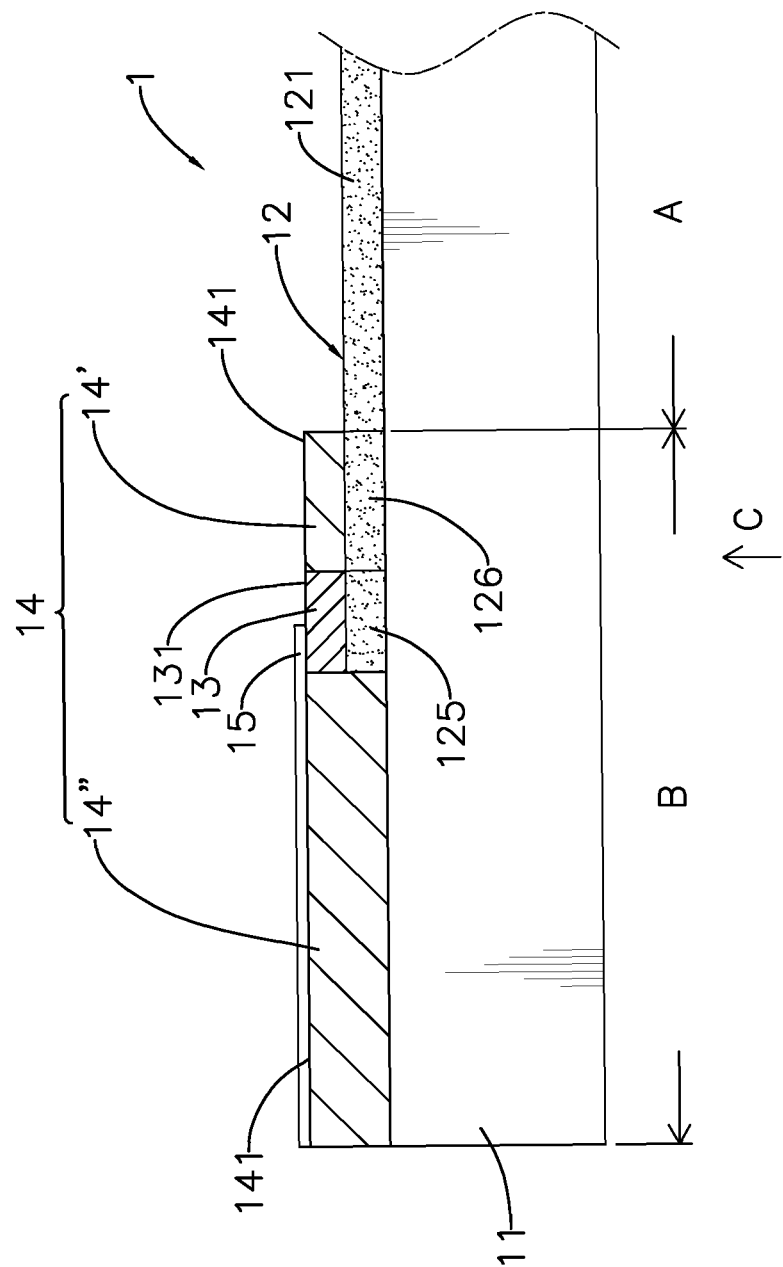
FIG. 2 is a partial cross-sectional view of the first embodiment of a touch panel in accordance with the present invention.

With reference to FIGS. 1 and 2, a first embodiment of a touch panel 1 in accordance of the present invention has a transparent substrate 11, a sensing electrode layer 12, a conductive light-shielding layer 13, an insulated light-shielding layer 14, and a wiring layer 15. With reference to FIG. 2, a user watches a touch screen comprising the touch panel 1 and operates the touch screen from a side marked with an arrow C.

The touch panel 1 has a display region A and a non-display region B, and the transparent substrate 11 is composed of a first section disposed in the display region A and a second section in the non-display region B and surrounding the first section. In the instant embodiment, the transparent substrate 11 is a glass substrate.

The sensing electrode layer 12 is formed in both the display region A and the non-display region B. The sensing electrode layer 12 comprises a first sensing section in the display region A and a second sensing section in the non-display region B. The first sensing section of the sensing electrode layer 12 is disposed on the first section of the transparent substrate 11 and in the display region A, and the second sensing section of the sensing electrode layer 12 extends from the first sensing section and is disposed on the second section of the transparent substrate 11 and in the non-display region B. In the instant embodiment, the sensing electrode layer is made of ITO.

With reference to FIG. 1, the first sensing section in the display region A comprises multiple first electrode units 121, multiple first axial wires 122, multiple second electrode units 123, multiple second axial wires 124 and multiple insulation layers (not shown). With reference to FIG. 2, the second sensing section in the non-display region B comprises multiple first sensing segments 125 and multiple second sensing segments 126, wherein the first sensing segments 125 are disposed at ends of the sensing electrode layer 12. With reference to FIG. 1, a part of the second sensing segments 126 are formed between the first electrode units 121 and the first sensing segments 125. The other second sensing segments are formed between the second electrode units 123 and the first sensing segments 125.

With reference to FIG. 1, the first electrode units 121 are arranged at constant intervals and disposed on the first section of the transparent substrate 11 in the display region A. The first electrode units 121 are arranged along a first axial direction D, and each two of the first electrode units 121 adjacent to each other are connected through the first axial wires 122. The second electrode units 123 are arranged at constant intervals and disposed on the first section of the transparent substrate 11 in the display region A. The second electrode units 123 are arranged along a second axial direction E, and each two of the second electrode units 123 adjacent to each other are connected through the second axial wires 124. The insulation layers (not shown) are formed between the first axial wires 122 and the second axial wires 124 to electrically isolate the connected first electrode units 121 from the connected second electrode units 123.

In the instant embodiment, the first axial wires 122 are arranged parallel with the first axial direction D, the second axial wires 124 are arranged parallel with the second axial direction E, and the first axial direction D is perpendicular to the second axial direction E. Since the first axial direction D intersects with the second axial direction E, the first electrode units 121 and the second electrode units 123 are disposed on the first segment of the transparent substrate 11 in a staggered manner, forming an electrode array to sense an exact position at which a user contacts.

With reference to FIGS. 1 and 2, the conductive light-shielding layer 13 is formed on the first sensing segments 125 and in the non-display region B. In other words, the conductive light-shielding layer 13 is formed on a part of the second sensing section. The insulated light-shielding layer 14 includes a first section of the insulated light-shielding layer 14' and a second section of the insulated light-shielding layer 14''. The first section of the insulated light-shielding layer 14' is formed in the non-display region B and formed above the second section of the transparent substrate 11 and on the second sensing segments 126. That is, the second section of the insulated light-shielding layer 14'' is formed on another part of the second sensing section and above the second section of the transparent substrate 11, and surrounds a side surface of the conductive light-shielding layer 13.

With reference to FIGS. 1 and 2, the conductive light-shielding layer 13 is electrically conductive and opaque, and contains a material of conductive graphite or conductive ink. The insulated light-shielding layer 14 has a second surface 141 opposite the transparent substrate 11 in the non-display region B, and the conductive light-shielding layer 13 also has a first surface 131 opposite the transparent substrate 11 in the non-display region B, said second surface 141 of the insulated light-shielding layer 14 is level with the first surface 131 of the conductive light-shielding layer 13.

The wiring layer 15 is formed on the conductive light-shielding layer 13 and the second section of the insulated light-shielding layer 14''. Accordingly, the wiring layer 15 is electrically connected with the sensing electrode layer 12 through the conductive light-shielding layer 13.

In accordance with the present invention, the conductive light-shielding layer 13 and the insulated light-shielding layer 14 are disposed on the transparent substrate 11 and cover over the whole non-display region B, and the conductive light-shielding layer 13, which is for electrically connecting the sensing electrode layer 12 with the wiring layer 15, is disposed above the transparent substrate 11 in the non-display region B. With such an arrangement, the touch panel 1 in accordance with the present invention can overcome the shortcoming of insufficient transmittance near the interface between the display region and the non-display region, thereby improving the optical performance of a touch screen comprising the touch panel 1 of the present invention. Further, since the second surface 141 of the insulated light-shielding layer 14 is level with the first surface 131 of the conductive light-shielding layer 13, the touch panel 1 has an improved surface flatness.

Figure 3:
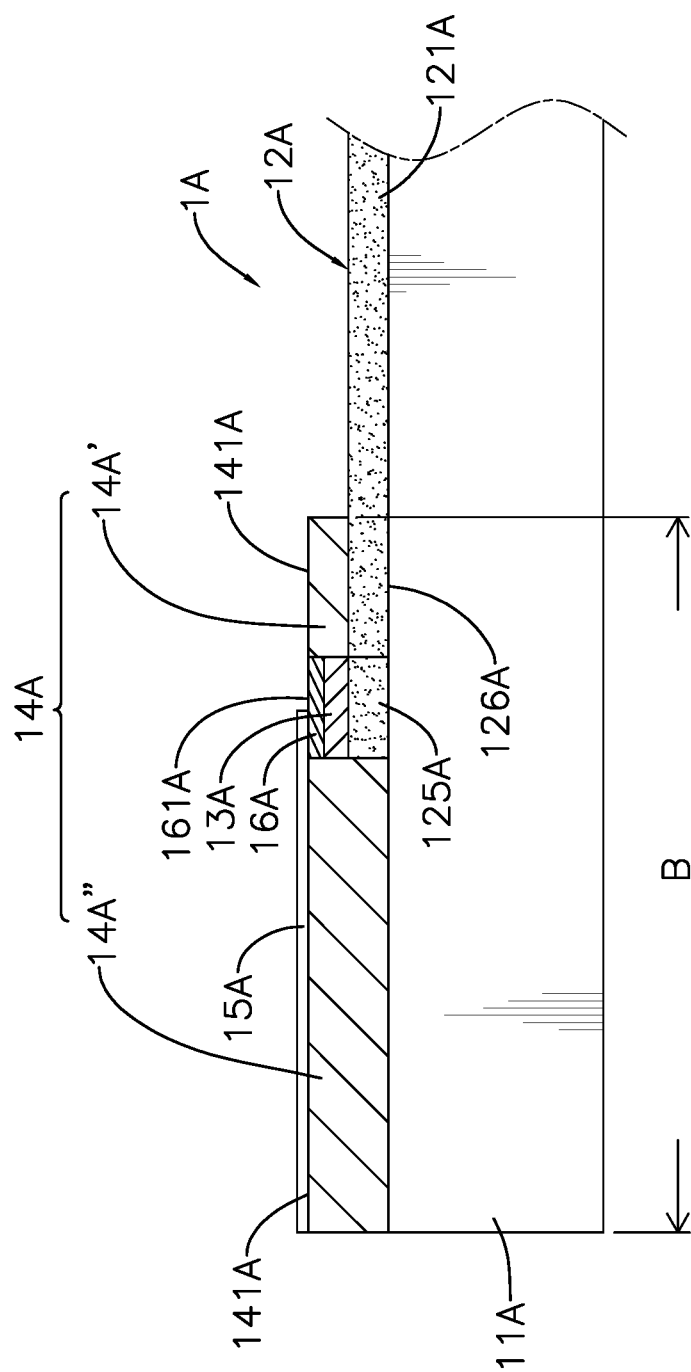
FIG. 3 is a partial cross-sectional view of a second embodiment of a touch panel in accordance with the present invention.
Figure 4:
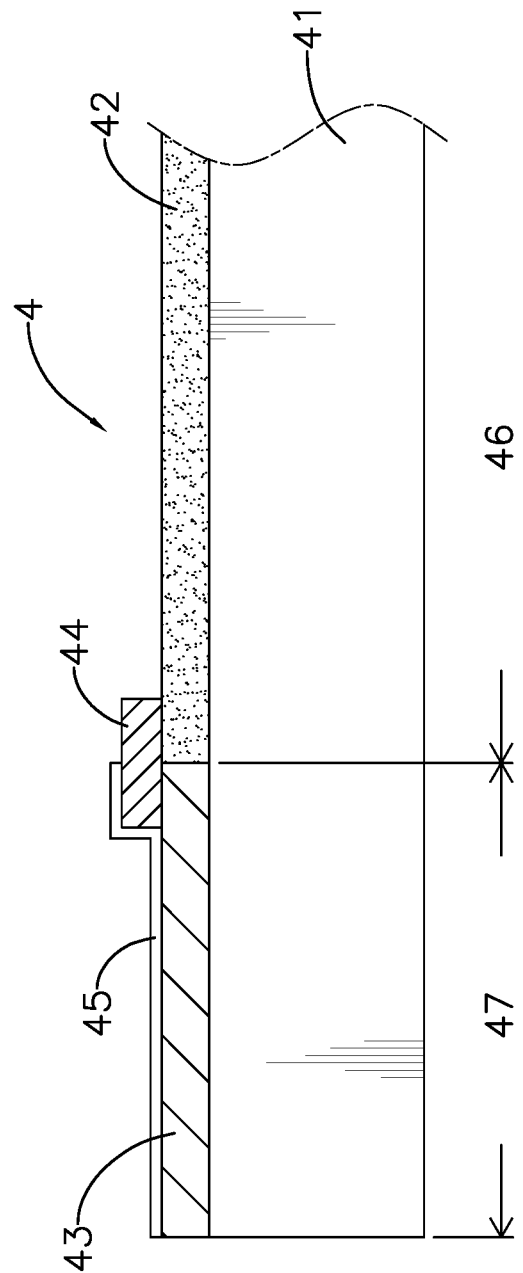
FIG. 4 is a partial cross-sectional view of a touch panel in the prior art.

With reference to FIG. 3, a second embodiment of a touch panel 1A has a similar structure as described in the first embodiment. Said touch panel 1A also has a transparent substrate 11A, a sensing electrode layer 12A, a conductive light-shielding layer 13A, an insulated light-shielding layer 14A, and a wiring layer 15A.

The sensing electrode layer 12A also has similar first electrode units 121A, first sensing segments 125A, and second sensing segments 126A. The insulated light-shielding layer 14A of the touch panel 1A of the second embodiment also includes a first section of the insulated light-shielding layer 14A' and a second section of the insulated light-shielding layer 14A".

The differences between the instant embodiment and the first embodiment include that the touch panel 1A further comprises a metal film 16A disposed between the wiring layer 15A and the conductive light-shielding layer 13A.

In the instant embodiment, the insulated light-shielding layer 14A also has a second surface 141A opposite the transparent substrate 11A in the non-display region B, and the metal film 16A has a third surface 161A opposite both the transparent substrate 11A in the non-display region B and the conductive light-shielding layer 13A. The second surface 141A of the insulated light-shielding layer 14A is level with the third surface 161A of the metal film 16A, such that the touch panel 1A of the instant embodiment also has an improved surface flatness.

In the instant embodiment, the metal film 16A may be laminated by two aluminum layers and a molybdenum layer formed between the aluminum layers. Due to a lower electrical resistance of the metal film 16A, the touch panel 1 comprising the metal film 16A can have a better signal transmission performance.

In conclusion, the conductive light-shielding layer, which is formed between the sensing electrode layer and the wiring layer and formed in the non-display region, not only can electrically connect the sensing electrode layer and the wiring layer for signal transmission, but also can cover the whole non-display region of the touch panel with the surrounding insulated light-shielding layer. It is ensured that a touch screen comprising the touch panel of the present invention has good optical performance in the display region, particularly at a position near the interface between the display region and the non-display region. Accordingly, the touch screen can have good touch sensing functions and a good optical performance at the same time.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A touch panel having a display region and a non-display region surrounding the display-region, the touch panel comprising:
   a transparent substrate disposed over the display region and the non-display region;
   a sensing electrode layer disposed on the transparent substrate and disposed in the display region and the non-display region;
   a conductive light-shielding layer disposed on the sensing electrode layer and in the non-display region; the conductive light-shielding layer having a first surface opposite the transparent substrate in the non-display region;
   an insulated light-shielding layer including a first section of the insulated light-shielding layer and a second section of the insulated light-shielding layer; the first section of the insulated light-shielding layer disposed on the transparent substrate in the non-display region and the second section of the insulated light-shielding layer disposed on the sensing electrode layer in the non-display region; the insulated light-shielding layer having a second surface opposite the transparent substrate in the non-display region; the second surface of the insulated light-shielding layer being level with the first surface of the conductive light-shielding layer; and
   a wiring layer disposed on the conductive light-shielding layer and the second section of the insulated light-shielding layer, the wiring layer electrically connected with the conductive light-shielding layer and the sensing electrode layer.

2. The touch panel as claimed in claim 1, wherein the insulated light-shielding layer is disposed surrounding the conductive light-shielding layer.

3. The touch panel as claimed in claim 1, wherein the sensing electrode layer in the display region comprises:
   multiple first electrode units disposed on the transparent substrate and in the display region, the first electrode units arranged at constant intervals along a first axial direction;
   multiple first axial wires each connecting two adjacent first electrode units;
   multiple second electrode units disposed on the transparent substrate and in the display region and arranged at constant intervals along a second axial direction, and the second axial direction intersecting with the first axial direction;
   multiple second axial wires each connecting two adjacent second electrode units; and
   multiple insulation layers formed between the first axial wires and the second axial wires.

4. The touch panel as claimed in claim 2, wherein the sensing electrode layer in the display region comprises:
   multiple first electrode units disposed on the transparent substrate and in the display region, the first electrode units arranged at constant intervals along a first axial direction;
   multiple first axial wires each connecting two adjacent first electrode units;
   multiple second electrode units disposed on the transparent substrate and in the display region and arranged at constant intervals along a second axial direction, and the second axial direction intersecting with the first axial direction;

multiple second axial wires each connecting two adjacent second electrode units; and multiple insulation layers formed between the first axial wires and the second axial wires.

5. The touch panel as claimed in claim 1, wherein the sensing electrode layer includes indium tin oxide, indium zinc oxide, aluminum zinc oxide, indium tin zinc oxide, zinc oxide, indium gallium zinc oxide or any combinations thereof.

6. The touch panel as claimed in claim 2, wherein the sensing electrode layer includes indium tin oxide, indium zinc oxide, aluminum zinc oxide, indium tin zinc oxide, zinc oxide, indium gallium zinc oxide or any combinations thereof.

7. The touch panel as claimed in claim 3, wherein the sensing electrode layer includes indium tin oxide, indium zinc oxide, aluminum zinc oxide, indium tin zinc oxide, zinc oxide, indium gallium zinc oxide or any combinations thereof.

8. The touch panel as claimed in claim 1, wherein the transparent substrate is made of a material including glass, quartz or transparent polymers.

9. The touch panel as claimed in claim 2, wherein the transparent substrate is made of a material including glass, quartz or transparent polymers.

10. The touch panel as claimed in claim 3, wherein the transparent substrate is made of a material including glass, quartz or transparent polymers.

11. The touch panel as claimed in claim 5, wherein the transparent substrate is made of a material including glass, quartz or transparent polymers.

12. The touch panel as claimed in claim 1, wherein the wiring layer is made of a material including copper, gold, silver, nickel, aluminum, chromium or any combination thereof.

13. The touch panel as claimed in claim 2, wherein the wiring layer is made of a material including copper, gold, silver, nickel, aluminum, chromium or any combination thereof.

14. The touch panel as claimed in claim 3, wherein the wiring layer is made of a material including copper, gold, silver, nickel, aluminum, chromium or any combination thereof.

15. The touch panel as claimed in claim 5, wherein the wiring layer is made of a material including copper, gold, silver, nickel, aluminum, chromium or any combination thereof.

16. The touch panel as claimed in claim 8, wherein the wiring layer is made of a material including copper, gold, silver, nickel, aluminum, chromium or any combination thereof.

17. The touch panel as claimed in claim 3, wherein the first electrode units are formed in a shape of triangle, rhombus, or hexagon.

18. The touch panel as claimed in claim 3, wherein the second electrode units are formed in a shape of triangle, rhombus, or hexagon.

19. The touch panel as claimed in claim 4, wherein the first electrode units are formed in a shape of triangle, rhombus, or hexagon.

20. The touch panel as claimed in claim 4, wherein the second electrode units are formed in a shape of triangle, rhombus, or hexagon.

* * * * *